(12) United States Patent
Hall et al.

(10) Patent No.: US 6,356,677 B1
(45) Date of Patent: Mar. 12, 2002

(54) FAST VARIABLE OPTICAL DELAY

(75) Inventors: Katherine L. Hall, Westford; Hosain Hakimi; Farhad Hakimi, both of Watertown; Daniel T. Moriarty, Hudson; Kristin A. Rauschenbach, Bedford, all of MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/362,349

(22) Filed: Jul. 27, 1999

Related U.S. Application Data

(60) Provisional application No. 60/117,146, filed on Jan. 25, 1999, and provisional application No. 60/126,730, filed on Mar. 29, 1999.

(51) Int. Cl.$^7$ ................................................. G02B 6/26
(52) U.S. Cl. .............................. 385/15; 385/24; 385/37; 385/42; 385/122; 359/127; 359/130; 359/188; 359/290
(58) Field of Search ............................... 385/15, 24, 37, 385/42, 122; 359/127, 130, 188, 290

(56) References Cited

U.S. PATENT DOCUMENTS 5,982,963 A   11/1999   Feng et al. ................... 385/37

OTHER PUBLICATIONS

"Real–Time Fourier Transformation in Dispersive Optical Fibers," Tomasz Jannson, Optics Letters, vol. 8, No. 4, Apr. 1983, pp. 232–234.

"Fibre Dispersion or Pulse Spectrum Measurement Using a Sampling Oscilloscope," Y.C. Tong et al., Electronics Letters, vol. 33, No. 11, May 22, 1997, pp 983–985.

"Space–Switching 2.5 Gbit/s Signals Using Wavelength Conversion and Phased Array Routing," A.A.M. Staring et al., Electronics Letters, vol. 32, No. 4, Feb. 15, 1996, pp 377–379.

"Applications of the Integrated Waveguide Grating Router," B. Glance et al., Journal of Lightwave Technology, vol. 12, No. 6, Jun. 1994, pp 957–962.

"Waveguide Array Wavelength Router Design to Improve Insertion Loss Uniformity," Hideaki Okayama et al., Optical Review, vol. 4, No. 5, 1997, pp 543–545.

"Recent Progress in Silica–Based Planar Lightwave Circuits on Silicon," M. Kawachi, IEE Proc. Optoelectron, vol. 143, No. 5, Oct. 1996, pp 257–261.

"Devices for Wavelength–Division Multiplexing (WDM)," Pierangelo Morra et al., Fiber Optics Handbook for Engineers and Scientists, Frederick C. Allard, Ed., 1990, Ch 3, pp 3.63–3.78.

"Interferometric All–Optical Switches for Ultrafast Signal Processing," Naimish S. Patel et al., Applied Optics, vol. 37, No. 14, May 10, 1998, pp 2831–2842.

(List continued on next page.)

Primary Examiner—Cassandra Spyrou
Assistant Examiner—Craig Curtis
(74) Attorney, Agent, or Firm—Fish & Richardson P.C.

(57) ABSTRACT

A method introduces variable time offsets into a stream of optical pulses. The method includes receiving a plurality of coherent optical pulses, receiving a plurality of control signals, and forming a coherent pulse array (CPA) from each pulse in response to one of the received control signals. Temporal spacings between pulses of each CPA are responsive to the associated one of the received control signals. For optical control signals, response times can be very short. The method further includes transmitting each pulse through a dispersive optical medium. The act of transmitting makes pulses of each CPA overlap to form an interference pattern.

25 Claims, 10 Drawing Sheets

OTHER PUBLICATIONS

"Nonlinear Loop Mirror Devices and Applications," K. J. Blow et al., BT Technol J, vol. 11, No. 2, Apr. 1993, pp 99–107.

"New 3–Port/4–Port Optical Circulator," Jay Van Delden, Photonics Spectra, Jan. 1992, 2 pages.

"Dense Wavelength Division Multiplexer," 1×16 and 1Z32 DWDM's with Integral Thermal Management System, Lucent Technologies Advertisement (1997) 2 pages.

"Dense Wavelength Division Multiplexing Networks: Principles and Applications," C. A. Bracket, IEEE Journal on Selected Areas in Communications, vol. 8, No. 6, Aug. 1990, pp 948–964.

FAST VARIABLE OPTICAL DELAY

This application claims the benefit of U.S. Provisional Application No. 60/117,146, filed Jan. 25, 1999, and U.S. Provisional Application No. 60/126,730, filed Mar. 29, 1999.

The U.S. Government has non-exclusive rights in this invention pursuant to contract number AF19628-95-C-0002 awarded by DARPA.

BACKGROUND OF THE INVENTION

This invention relates generally to optical circuits and networks, and more particularly, to variable optical delays.

Variable optical delays have potential applications in both optical data networks and optical logic circuits. The applications involve synchronizing internal components of such networks and logic circuits to external data streams and other internal components, respectively. Synchronizing entails changing the arrival times of optical signals.

One potential application of such delays is the construction of packet-switched optical networks. Packet-switched networks need to resynchronize receivers on a pack-by-packet basis. The need for packet-by-packet resynchronization may be met by variable time delays produced by either delay lines or clock recovery techniques.

The prior art includes several types of variable optical delay lines. Some such lines use either a stepping motor or a piezo-electric transducer to mechanically change the length of an optical fiber or a gap, carrying the arriving signal. Other delay lines use an acousto-optic modulator or another type of beam scanning crystal to convert changes in arriving beam angles into variable delays. These types of delay lines are typically characterized by response times on the order of milliseconds or longer.

The prior art also includes techniques for varying the phase of an optical clock. One clock recovery technique uses electro-optical phase locked loops. Another clock recovery technique uses injection locking of a receiver's optical clock to the data stream. Both of these techniques have response times in the millisecond range.

SUMMARY OF THE INVENTION

In one aspect, the invention provides a method to introduce variable time offsets into a stream of optical pulses. The method includes receiving a plurality of coherent optical pulses, receiving a plurality of control signals, and forming a coherent pulse array (CPA) from each pulse in response to one of the received control signals. Temporal spacings between pulses of each CPA are responsive to the associated one of the received control signals. The method further includes transmitting each pulse through a dispersive optical medium. The act of transmitting makes pulses of each CPA overlap to form an interference pattern.

In some embodiments, the method further includes sending each interference pattern through an intensity discriminator to pass a peak thereof.

In some embodiments, the act of forming a CPA for each pulse further includes splitting each received pulse into a plurality of pulses, and delaying at least one of the pulses. The act of delaying includes propagating the one of the pulses and the associated one of the control signals in a nonlinear optical media.

Some embodiments further filter the associated one of the control pulses from the nonlinear medium. Other embodiments propagate the pulses and the associated control signals in opposite directions in the nonlinear medium.

In general, in a second aspect, the invention features a variable temporal grating generator (TGG). The variable TGG includes an amplitude splitter to split a received optical pulse into a plurality of pulses, a plurality of optical waveguides, and a waveguide coupler connected to receive pulses from the optical waveguides. Each waveguide receives one of the pulses from the splitter. At least one of the waveguides has a variable path element. The variable path element has a control terminal and a optical path length responsive to control signals received at the control terminal. The coupler has an output terminal to transmit CPA's made of the pulses received.

In some embodiments, the variable path element further includes a nonlinear optical medium coupled to receive pulses traveling through the waveguide. The signals received by the control terminal are optical signals. The control terminal transmits a portion of each optical signal to the nonlinear medium.

In some embodiments, the variable TGG further includes an optical waveguide coupled to receive the CPA's from the output terminal and a high frequency signal generator. The generator sends electrical or optical driving signals to a portion of the optical waveguide. The driving signals vary the index of refraction of the portion of the waveguide.

In general, in a third aspect, the invention features a variable optical delay line. The optical delay line includes a length of dispersive medium and a TGG having an optical input terminal, an optical output terminal and a control terminal. Either the optical input terminal or the optical output terminal couples to one end of the dispersive medium. The TGG generates a CPA at the optical output terminal from each pulse received at the optical input terminal. Temporal spacings of pulses of each CPA are responsive to control signals received at the control terminal. The dispersive medium causes each CPA to produce an interference pattern.

In some embodiments, the dispersive media is a dispersive optical waveguide. The variable TGG may also include an optical clock producing coherent clock pulses. The output terminal of the clock connects either to an end of the waveguide or to the input terminal of the variable TGG. The variable optical delay line may also include an intensity discriminator to receive each interference pattern.

In various embodiments, the variable TGG further includes an amplitude splitter and a plurality of optical waveguides. The splitter splits an optical pulse received from the input terminal into a plurality of pulses. Each waveguide connects to receive one of the pulses from the splitter. At least one of the waveguides includes a variable path element coupling to the control terminal. The variable path element has an optical path length responsive to the control signals. The variable TGG also includes a waveguide coupler connected to receive pulses from the optical waveguides. The waveguide coupler has a second output terminal to transmit a portion of the pulses received.

The variable path element may further include a nonlinear optical medium coupled to receive pulses traveling through the one of the waveguides. The signals received by the control terminal are optical signals. The control terminal is connected to transmit a portion of each optical signal to the nonlinear medium.

In general, in a fourth aspect, the invention features an optical phase locked loop (OPLL). The OPLL includes an optical switch, an optical clock, a dispersive optical waveguide coupled to the optical clock, and a variable TGG having a control terminal. The switch has two input terminals and one output terminal. The variable TGG receives clock pulses from the dispersive waveguide and transmits interference patterns to one input terminal of the optical switch. The output terminal of the switch couples to the control terminal.

In various embodiments, the output terminal of the optical switch transmits optical signals to the control terminal.

In general, in a fifth aspect, the invention features an antenna array. The array includes a plurality of remote antennae and a control system to produce optical control signals. The array includes a plurality of first optical waveguides that receive the signals from the control system. The array also includes a plurality of variable TGG's and a plurality of second waveguides. Each TGG couples to one of the first waveguides. Each second waveguide connects one of the TGG's to one of the remote antennae. Each second waveguide produces an interference pattern from a CPA received from the connected TGG.

Other features, and advantages of the invention will be apparent from the following description of the preferred embodiments and the claims.

DESCRIPTION OF THE PREFERRED EMBODIMENTS

Figure 1:
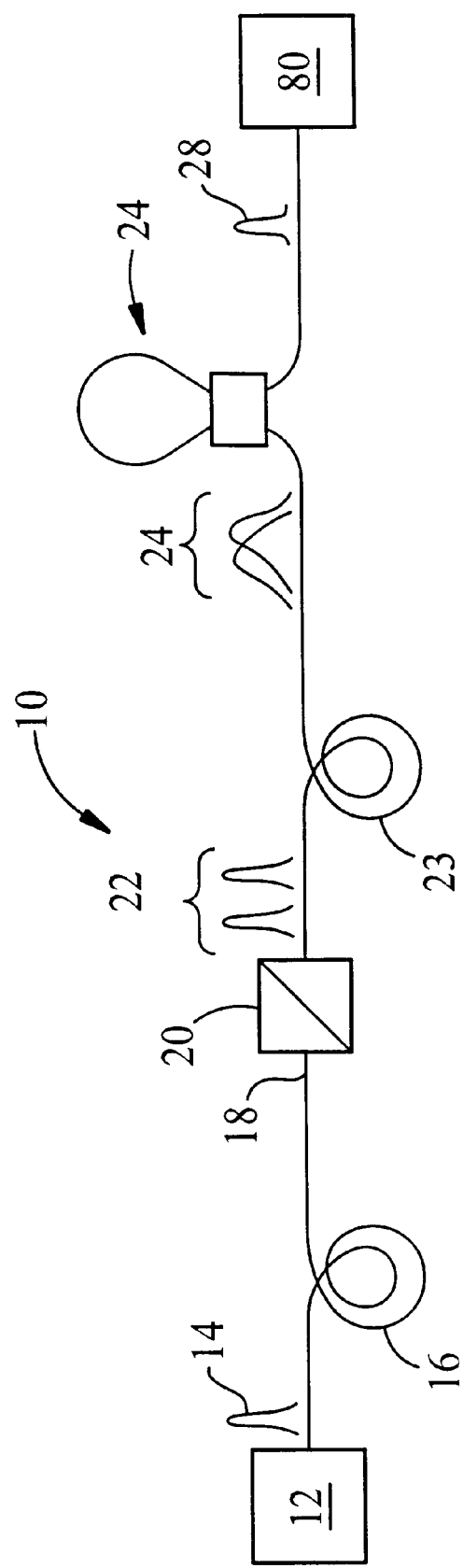
FIG. 1 shows a setup for showing the production of optical time delays with dispersion induced interference.
Figure 2A:
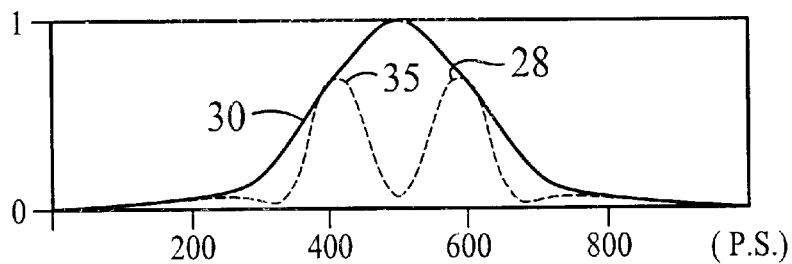
FIGS. 2A–2D show interference patterns produced by the setup of FIG. 1 or various pulse spacings in a CPA.
Figure 2B:
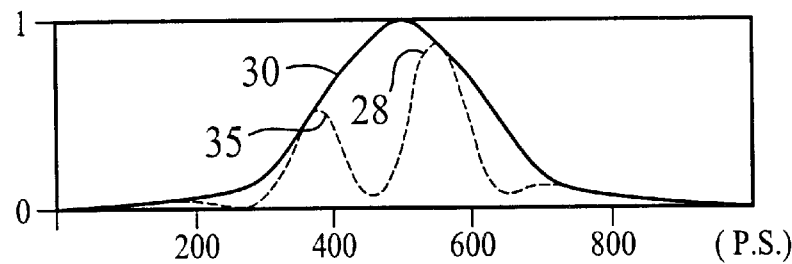
Figure 2C:
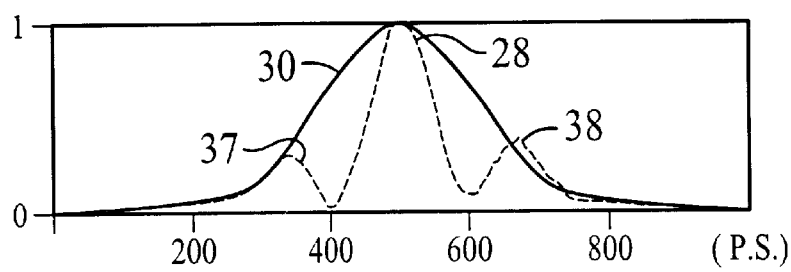
Figure 2D:
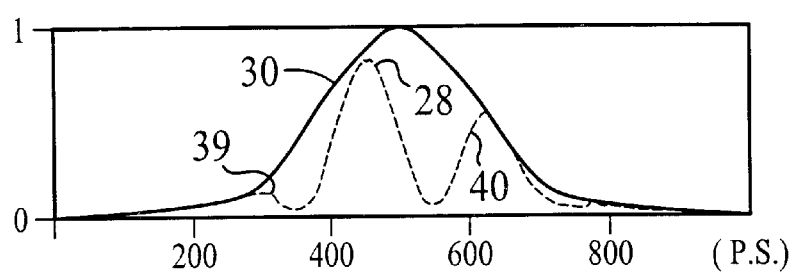

FIG. 1 shows a setup 10 for demonstrating that dispersion combined with coherent pulse array (CPA) production can generate an optical delay. The setup 10 includes a mode locked fiber laser 12, which produces a 2 pico second (ps) coherent optical pulse 14. Pulse 14 travels through a length of polarization maintaining fiber (PMF) 16. PMF 16 is a birefringent fiber in which the polarization of pulse 14 is oriented at about 45° with respect to the internal PMF axes. The perpendicular polarization components of the pulse 14 travel at different speeds in the PMF 16. At an output 18 of PMF 16, the two components pass through a polarizer 20 that projects the components along the same direction to produce a 2-pulse CPA 22 in which each pulse has the same polarization. If PMF 16 has a length of about 4.6 meters, CPA 22 will contain two mutually coherent pulses, which are still about 2 ps wide and are about 6 ps apart.

The pulses of CPA 22 travel through about 10.6 kilometers of dispersive optical fiber 23. Dispersive fiber 23 broadens each pulse of CPA 22 to a width of about 240 ps. The broadening produces CPA 24 in which the two pulses strongly overlap and interfere.

FIGS. 2A–2D show interference patterns produced by the overlapping CPA 24 for different lengths of the birefringent PMF 16. Each different length of the PMF 16 produces a different temporal spacing of the two pulses of the original CPA 22 and a different interference pattern.

Each interference pattern has one larger peak 28 and one or more smaller peaks 35–40. Peaks 28, 35–40 are located in a 240 ps wide envelope 30. Envelope 30 is the pattern that would be produced by inserting the original pulse 14 directly into dispersive fiber 23. Because the pulses of CPA's 24 producing the patterns for each figure have different temporal spacings, the location of larger peak 28 moves in time.

The original pulses of the CPA 22 may have small temporal separations. For example, these separations may be of the order of the time for light to travel a fraction of a wavelength, i.e., a microscopic distance. Such small temporal separations induce phase shifts between the broadened pulses recombined in the CPA 24 and the non-trivial interference patterns of FIGS. 2A–2D.

Referring again to FIG. 1, a nonlinear optical loop mirror (NOLM) 26 receives the broadened CPA 24. NOLM 26 removes portions of the optical signal whose intensities are below a threshold value, e.g., smaller peaks 35–40 of FIGS. 2A, 2B, 2C, and 2D. Portions of the signal above the threshold value, e.g., larger peak 28 of FIGS. 2A, 2B, 2C, and 2D, pass through NOLM 26 without substantial attenuation.

Figure 3:
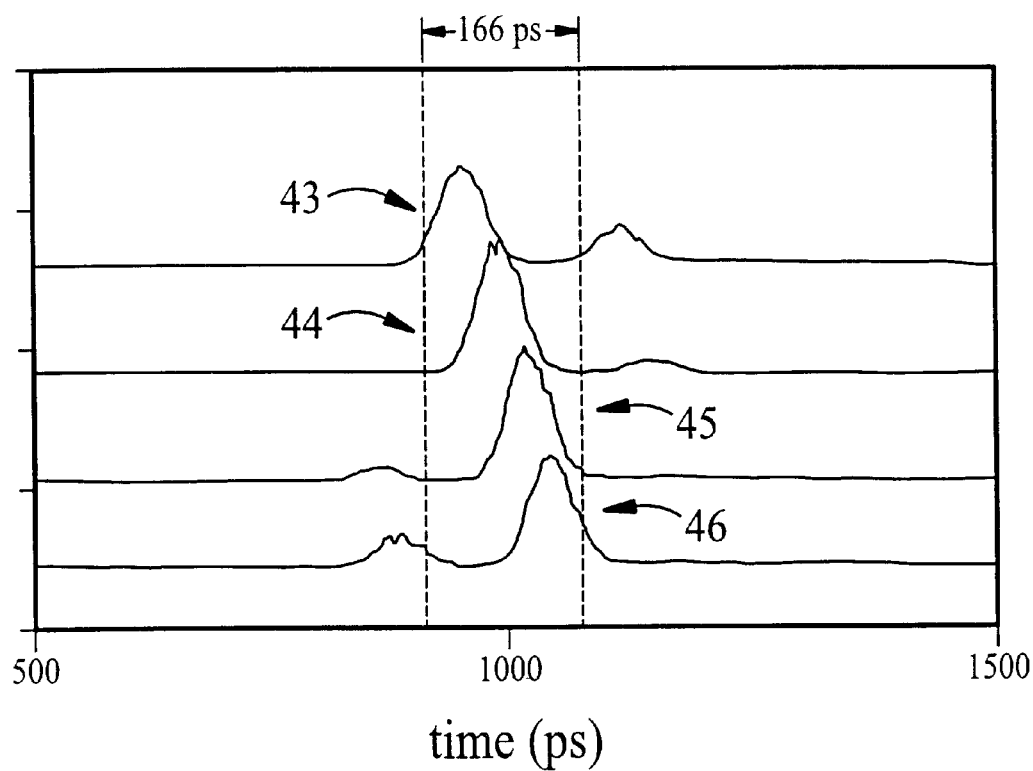
FIG. 3 shows the delayed optical pulses produced by filtering the patterns of FIGS. 2A–2D with a NOLM.

FIG. 3 shows the optical signals 43–46 produced by NOLM 26 of FIG. 1 for four pulse spacings in the original CPA 22. The range of timing delays for signals 43–46 is about 150 ps. The range of obtainable timing delays is approximately the width of the dispersion envelope, e.g., envelope 30 of FIGS. 2A–2D, that would result in the absence of interference.

The timing delay is determined by the temporal spacing between the mutually coherent pulses of the original CPA 22. Changing the temporal spacing between the original pulses by about $\lambda n/2c$ produces an equivalent optical phase shift of $\pi$. This phase shift changes the time delay of the highest peak 28 by about the full-width at half maximum of the dispersion envelope 30 of FIGS. 2A–2D. Here, $\lambda$, n, and c are the wavelength of the pulses, the index of refraction of fiber 16, and the speed of light, respectively. For 1.5 micrometers wavelength light, changing the separation between the pulses of the CPA 22 by $2.5 \times 10^{-15}$ seconds shifts the time delay of the highest peak in the CPA 24 by about the full-width at half maximum.

Figure 4A:
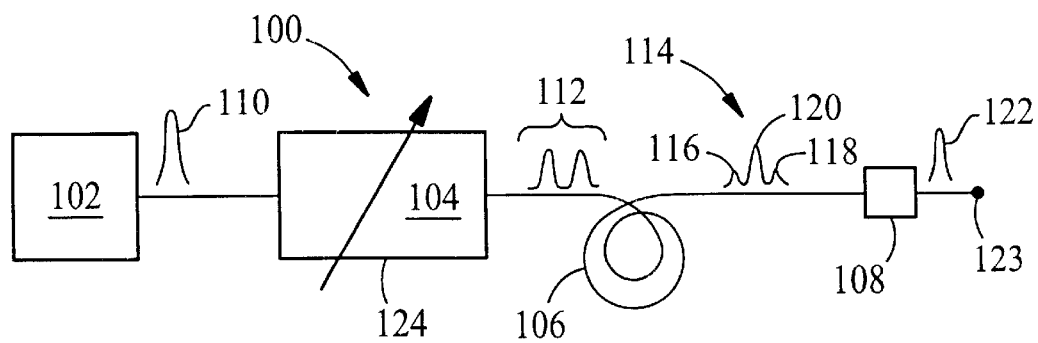
FIGS. 4A and 4B show two embodiments of a variable optical delay line.

FIG. 4A shows one embodiment of a variable optical delay line 100. Variable optical delay line 100 includes a source 102 that produces a stream of optical pulses. The pulses may be mutually incoherent or coherent. Source 102 may be either an input terminal of a receiver or an optical clock or optical data source. Source 102 couples to a variable temporal grating generator (TGG) 104. Variable TGG 104 couples to an input end of a dispersive optical waveguide 106. The output end of optical waveguide 106 couples to the input of an optical intensity discriminator 108, e.g., a NOLM.

Herein, waveguides may be optical fibers or other optical conduits that direct light along well-defined paths. The optical conduits may be constructed of linear, non-linear, or electro-optical materials.

Variable TGG 104 splits each optical pulse 110 received from source 102 into a CPA 112, which may include two or more pulses. CPA 112 travels through dispersive waveguide 106, which broadens the individual pulses so that they overlap. Since the individual pulses of the initial CPA 112 are mutually coherent, their overlap produces an interference pattern 114. Interference pattern 114 passes through intensity discriminator 108, which removes subsidiary peaks 116 and 118 from pattern 114 and transmits the largest peak 120. Thus, each optical pulse 110 from source 102 produces one outgoing optical pulse 122.

The temporal spacing of the pulses of CPA 112 is controlled by a signal applied to control terminal 124 of variable TGG 104. The pulse spacings also determine the time delay or offset of output pulse 122, as has been described in relation to FIGS. 2A–2D and 3. Thus, the time delay or offset produced by the line 100 is controllable by control input 124 of variable TGG 104.

Some embodiments of the variable optical delay line use an optical clock for source 102 to produce an optical clock with a variable offset.

Figure 4B:
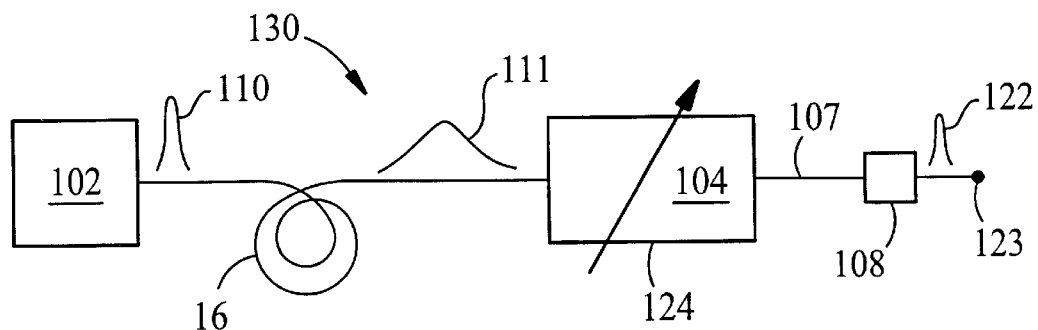

FIG. 4B shows a variable optical delay line 130, which is an alternative embodiment. In variable optical delay line 130, dispersive waveguide 106 is located between source 102 and variable TGG 104. Thus, pulse 110 broadens to produce pulse 111 prior to entering variable TGG 104. Then, the pulses of the CPA which are produced by TGG 104 immediately overlap and interfere at the output of TGG 104.

In delay lines 100 and 130 of FIGS. 4A and 4B, changing the control signal on terminal 124 changes the form of the CPA's produced by TGG 104. But, this change does not affect signals produced by lines 100 and 130 until the changed CPA's propagate to the input terminal of the intensity discriminator 108 and thereafter to the output terminal 123. In line 100, the CPA's have to travel through the long dispersive waveguide 106 to reach input terminal 108. Thus, line 100 has a longer response time than line 130 where the CPA's do not have to travel through dispersive waveguide 106 before reaching output terminal 123.

Figure 5:
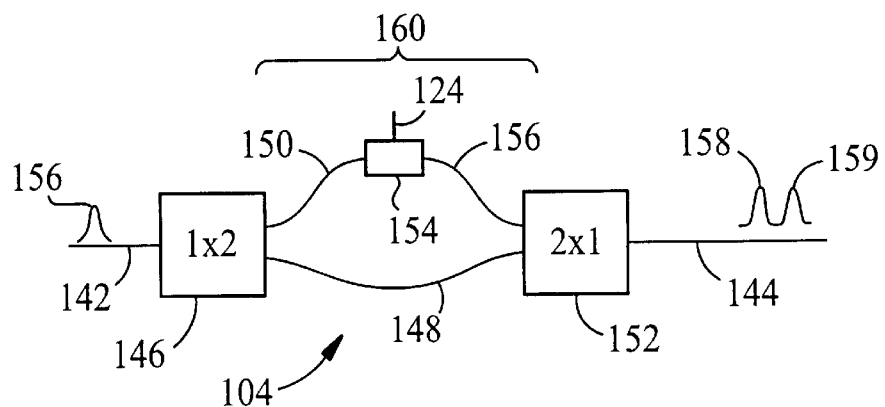
FIG. 5 shows an embodiment of a variable TGG for use in the optical delay line of FIGS. 4A and 4B.

FIG. 5 shows an embodiment of variable TGG 104 used in delay lines 100 and 130 of FIGS. 4A and 4B, respectively. Variable TGG 104 has an optical input terminal 142 and an optical output terminal 144. Input terminal 142 is an input terminal of a 1×2 waveguide coupler 146, e.g., an amplitude dividing coupler. The output terminals of the 1×2 waveguide coupler 146 connect to first and second optical waveguides 148 and 150, e.g., single-mode optical waveguides. First optical waveguide 148 couples to an input terminal of a 2×1 optical combiner 152. Second waveguide 150 couples to an input terminal of a path element 154 providing a variable optical path length. The output terminal of path element 154 couples to a third waveguide 156, which in turn couples to the second input terminal of the 2×1 waveguide combiner 152. The output terminal of the 2×1 combiner 152 is output terminal 144 of the variable TGG 104.

From each received pulse 156, the TGG 104 produces a CPA having two mutually coherent pulses 158 and 159 at output terminal 144. The temporal spacing of the pulses 158 and 159 depends on the difference between the optical lengths of waveguide 148 and path 160. The difference in the optical lengths depends on the control signal applied to control terminal 124 of path element 154. The control signal controls the optical length of the path element 154.

The path element 154, which has a variable optical length, can have a variety of different forms. Some forms for element 154 are illustrated in FIGS. 6A–6D and 7A–7B.

Figure 6A:
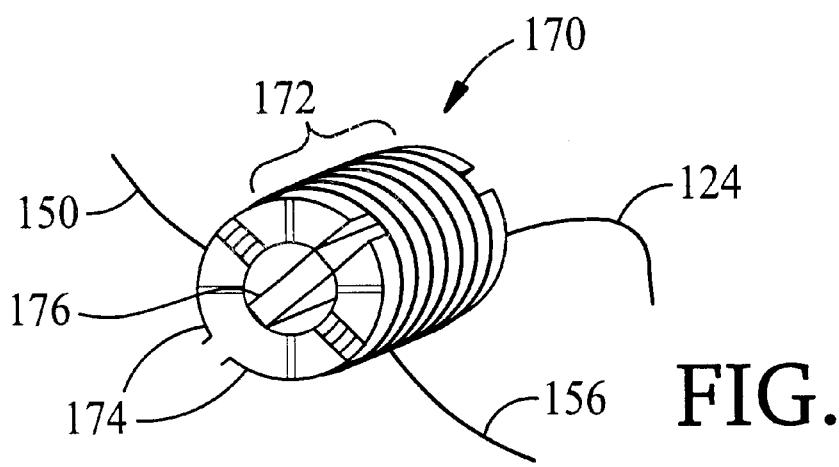
FIGS. 6A–6D show alternate constructions of the variable optical path used in the variable TGG of FIG. 5.

FIG. 6A shows a path element 170 in which the optical path length is mechanically controllable. Element 170 includes a roll 172 of optical fiber, which is tightly wrapped around a split reel 174. A voltage applied to control terminal 124 controls a piezo-electric device 176. Piezo-electric device 176 in turn exerts a pressure on the interior of reel 174 to expand the split reel's width. Expanding reel 174 stretches the fiber thereby lengthening the optical path length associated with fiber roll 172.

Figure 6B:
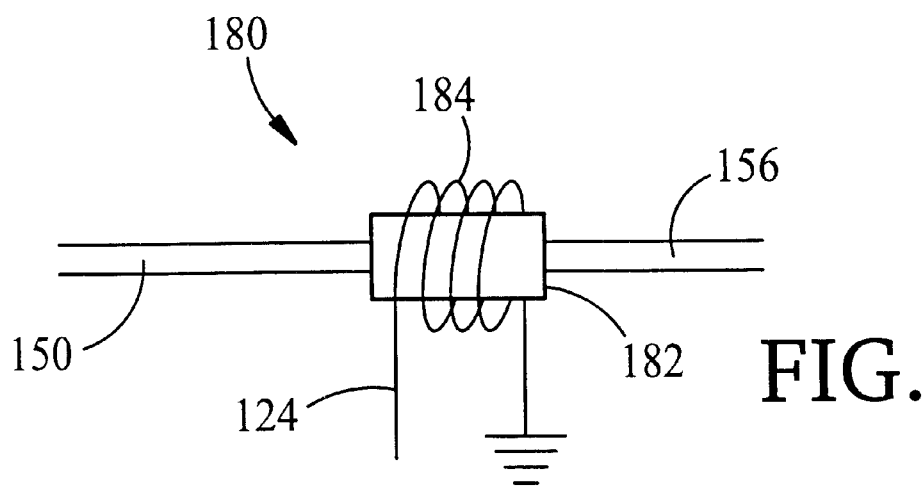

FIG. 6B shows a path element 180 in which the optical path length is thermally controllable. Path element 180 includes an optical medium 182 whose index of refraction changes with applied temperature. The temperature is controlled by a current flowing in an electrical resistor 184, which wraps tightly around optical medium 182. Resistor 184 electrically connects between control terminal 124 and ground.

Figure 6C:
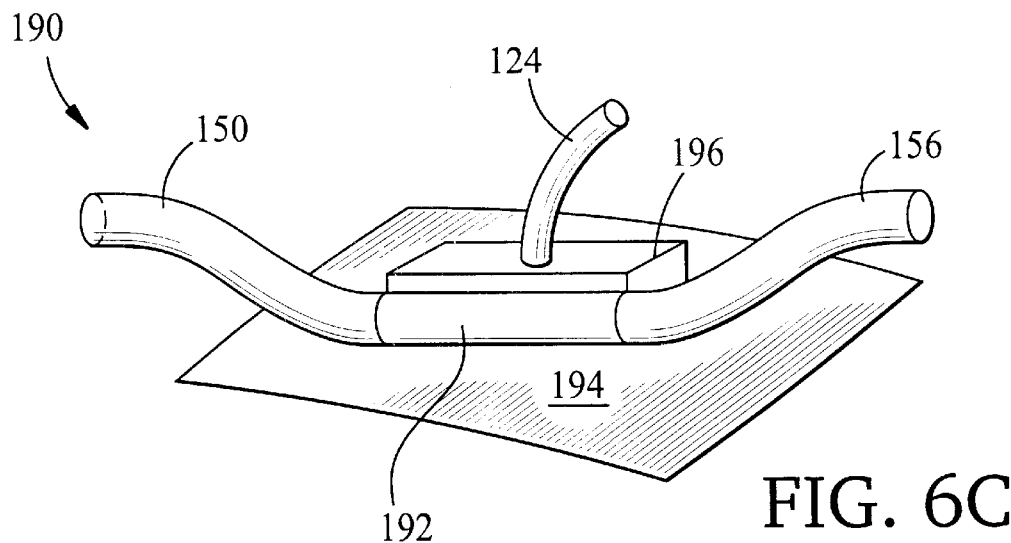

FIG. 6C shows a path element 190 in which the optical path length is electrically controllable. Path element 190 is an electro-optical device, which includes an optical waveguide 192 located between a substrate 194 and an electrode 196. The voltage on electrode 196 controls the index of refraction of waveguide 192, e.g., a $LiNbO_3$ material, and the optical path length thereof. The voltage applied to electrode 196 is controllable through control terminal 124.

Figure 6D:
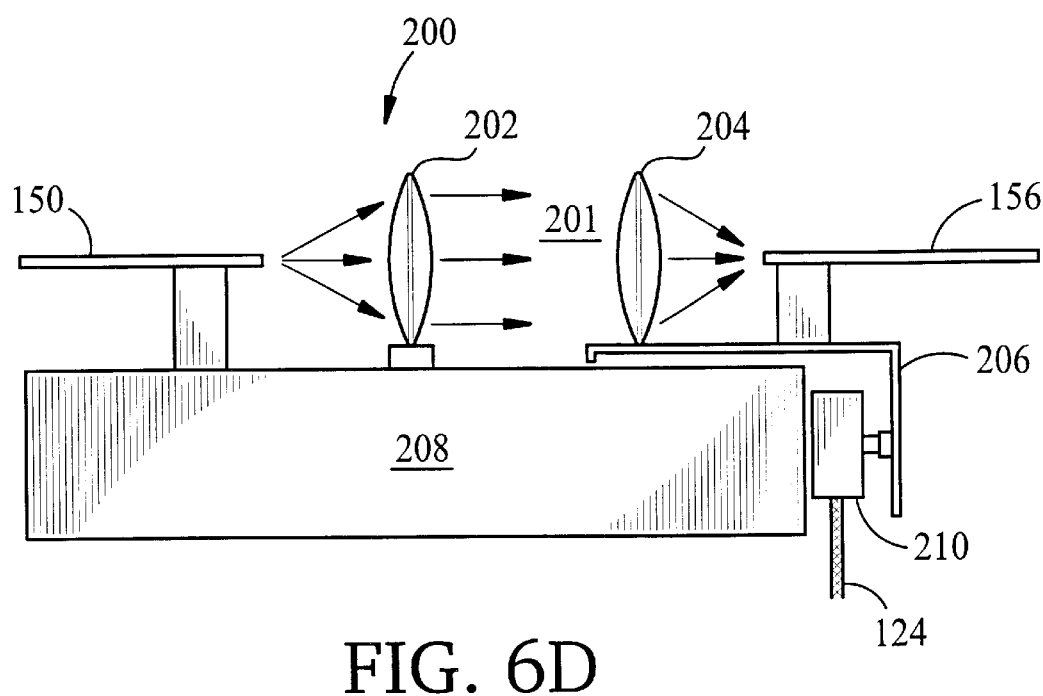

FIG. 6D shows another path element 200 in which the optical length is mechanically controllable. Path element 200 includes an air gap 201 between collimating lenses 202 and 204. Lens 204 and waveguide 156, which couples to the output of path element 200, are mounted on a mechanical holder 206. Holder 206 fixes to a base plate 208. The lateral position of holder 206 on base plate 208 is adjustable through an elector-mechanical device 210 mounted laterally between baseplate 208 and holder 206. The voltage on control terminal 124 determines the lateral position of holder 206 and the width of air gap 201.

Some embodiments of variable path element 154 of FIG. 5 have optical path lengths, which are adjustable through optical control pulses. Such variable path elements are illustrated in FIGS. 7A and 7B.

Figure 7A:
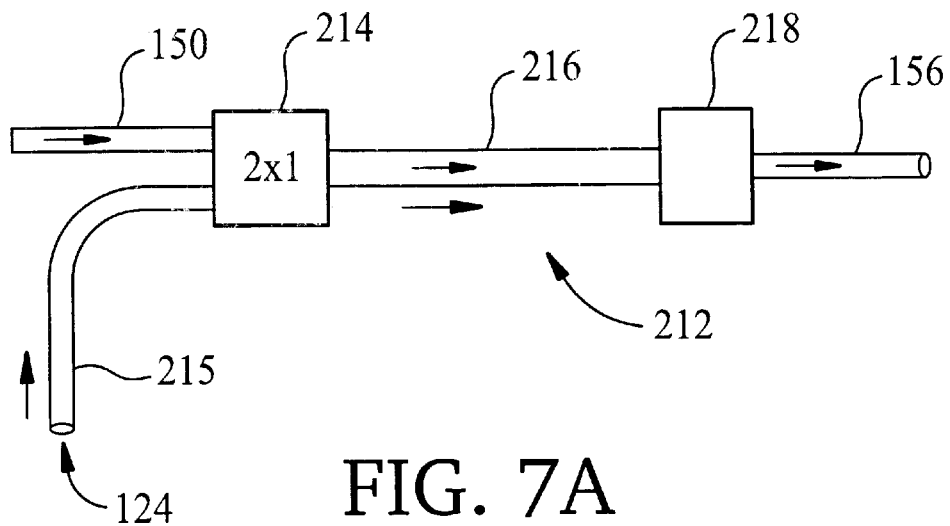
FIGS. 7A–7B show alternate constructions of the variable optical path of FIG. 5, which use nonlinear optical media.
Figure 7B:
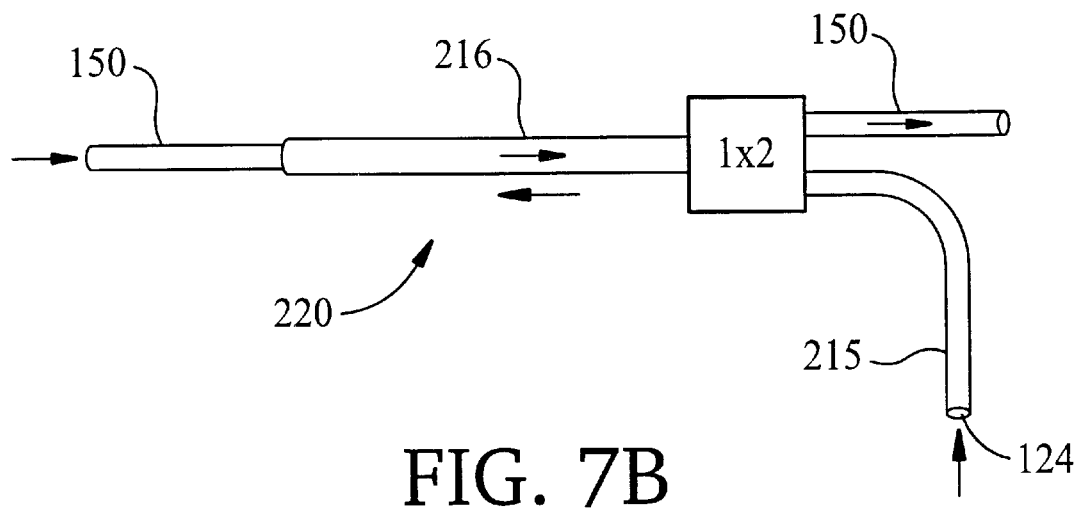

FIG. 7A shows a variable path element 212 which uses a nonlinear optical media. Path element 212 includes a 2×1 waveguide coupler 214, e.g., an inverted amplitude splitter or a birefringent coupler, whose input terminals couple to optical waveguide 150 and optical waveguide 215. Waveguide 215 forms control terminal 124 of FIG. 5, i.e., path element 212 has an optical control. The output terminal of the 2×1 coupler 214 connects to an input end of an optical waveguide 216 constructed of a nonlinear material. The output end of waveguide 216 couples to a filter 218 whose output terminal couples to waveguide 156 of FIG. 5.

The index of refraction of the nonlinear material of waveguide 216 depends on the total light intensity therein. The light intensity is controlled by an optical control pulse of intensity I introduced into waveguide 215 via the control terminal 124. The control pulse travels through waveguide 216 changing the optical path length for coincident pulses traveling between waveguides 150 and 156. The change in the optical path length, $\Delta L$, is proportional to the change in the index of refraction times the physical path length. In the nonlinear material, the total change in the optical path length is $\Delta L = (n_2)(I)(L)$, which shifts a pulse's phase by $\Delta \phi = 2\pi (n_2)(I)(L)/\lambda$. Here, $n_2$ is the nonlinear refractive index (a material parameter) of waveguide 216, and L is the physical length of waveguide 216.

Since light intensity controls the optical path length of waveguide 216, selecting an optical path length only constrains the intensity of a control pulse. The wavelength and/or polarization of the control pulse can be chosen freely. Some embodiments chose control pulses whose wavelength and/or polarization are different than those of the pulses coming from waveguide 150. For such pulses, a bandpass filter 218 reduces contamination of the output of path element 212 by the control pulse. Filter 218 selectively attenuates the control pulse based on the differences between the wavelength and/or polarization of the control pulse and the pulses from waveguide 150.

FIG. 7B shows a variable path element 220, which uses a nonlinear optical media. Path section 220 is similar to the section 212 of FIG. 7A except that the control pulse travels in one direction, indicated by heavy arrows, and the pulse entering by the waveguide 150 travels in the opposite direction, indicated by light arrows. The opposite flow directions mean that the control pulse does not contaminate the signal at output waveguide 156. Thus, path element 220 does not need filter 218 to remove the control pulse from the output of element 212 of FIG. 7A.

In some embodiments, the nonlinear waveguide 216 of path element 220 may be waveguide 150 itself.

Figure 8:
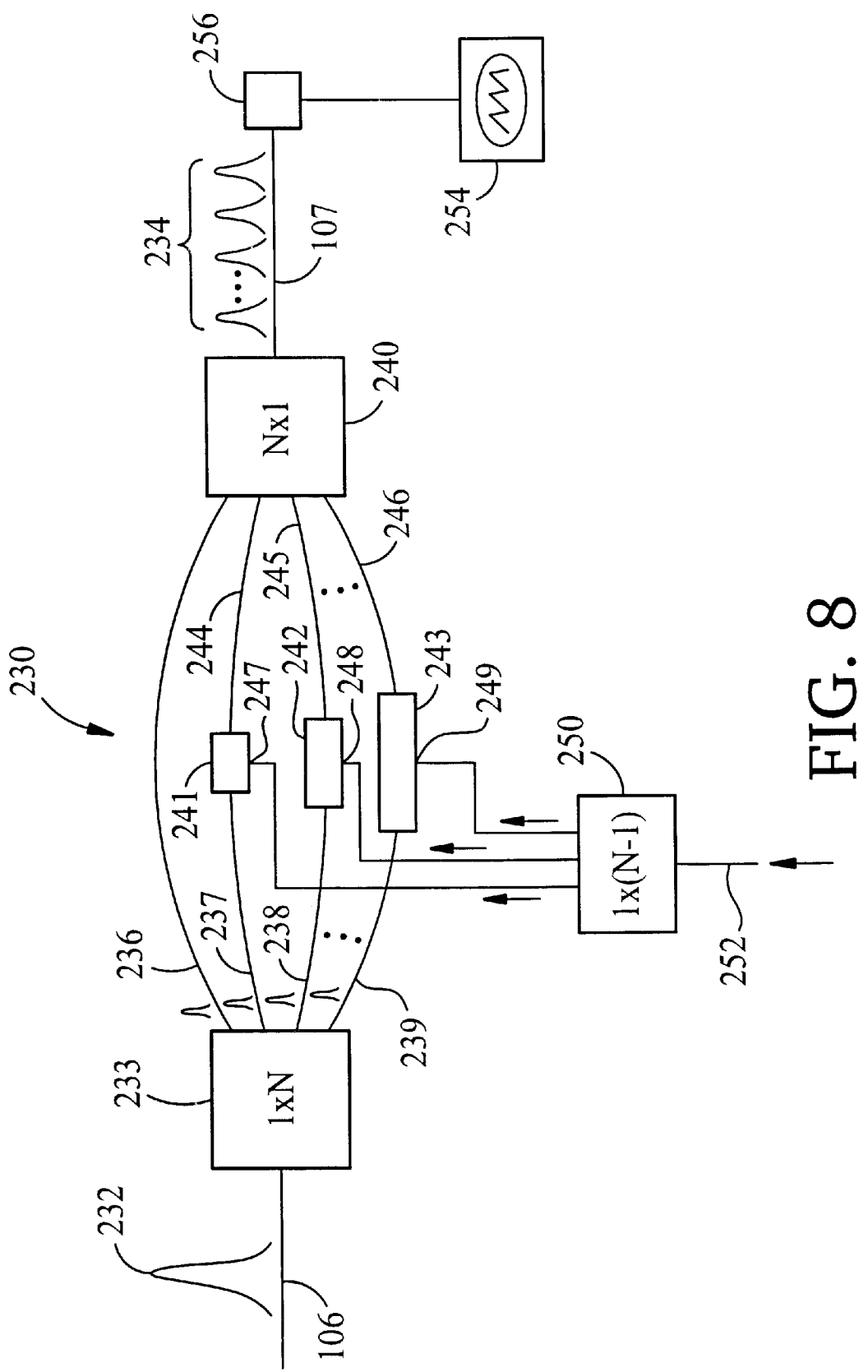
FIG. 8 shows another embodiment of a variable TGG.

FIG. 8 shows a variable TGG 230 which is another embodiment of variable TGG 104 of FIG. 4B. Variable TGG 230 receives a input pulse 232 from waveguide 106. Pulse 232 enters a 1×N waveguide coupler 233 that amplitude splits the pulse into N mutually coherent pulses directed into optical waveguides 236, 237, 238, and 239. The first waveguide 236 carries the received pulse to an input terminal of a N×1 waveguide coupler 240. The other waveguides 237–239 carry the received pulses to variable path elements 241–243, which may be implemented in the various manners illustrated in FIGS. 7A–7B. Variable path elements 241–243 delay the pulses and transmit the delayed pulses to waveguides 244–246. Waveguides 244–246 carry the delayed pulses to other input terminals of the N×1 waveguide coupler 240. The N×1 coupler 240 recombines the received pulses to produce an N pulse CPA 234 on output optical waveguide 107.

Each path element 241, 242, and 243 includes a linear, nonlinear or electro-optic material, e.g., variable waveguides 172, 182, 192, 201, and 216 of FIGS. 6A–7B, through which received control signals travel. Path elements 241, 242, and 243 also have control terminals 247, 248, and 249, e.g., terminal 124 of FIGS. 6A–7B. Lengths of the waveguides connecting 1×(N−1) waveguide coupler 250 to terminals 247–249 are designed to synchronize arrivals of control signals in the linear, nonlinear or electro-optic materials of the different path elements 241, 242, and 243.

Variable TGG 230 produces equal spacings in CPA 234 if the control signals have the same intensity at terminals 247–249 and the relative lengths of the nonlinear media of the elements 241, 242, and 243 have the values 1, 2, ..., N−1.

Some embodiments use intensity attenuators (not shown) to adjust the intensities of the individual control signals produced by the 1×N coupler 250.

A signal generator 254 coupled to TGG 230 can be used to modify inter-pulse spacings of the CPA 234. Signal generator 254 modulates the path length of a path segment 256. By synchronizing the modulation of the path length of segment 256 with the passage of individual pulses of CPA 234, changes to the inter-pulse spacings in CPA 234 are achieved.

In some embodiments, path segment 256 has nonlinear optical properties. Then, signal generator 254 may be used to generate optical signals that modulate the index of refraction of path segment 256.

Figure 9:
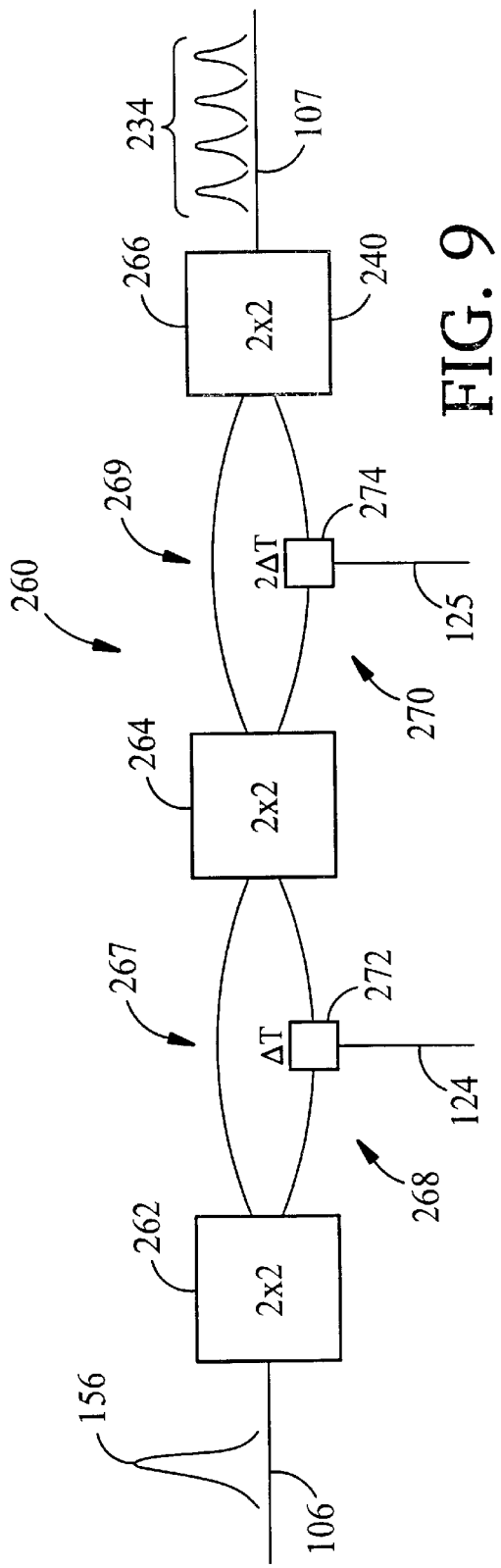
FIG. 9 shows another embodiment of a variable TGG, which uses Mach Zehnder interferometers.

FIG. 9 shows a variable TGG 260 employing a Mach Zehnder geometry. TGG 260 includes a sequence of 2×2 waveguide couplers 262, 264, and 266 interconnected by pairs of optical waveguides 267, 268, 269, and 270. One of the waveguides 268 and 270 of each pair includes a variable path element 272 and 274, respectively, which responds to signals received from a control terminal 124 and 125. Element 272 produces a time difference, ΔT, between the time required for pulses to travel through waveguide 268 and to travel through waveguide 267. Similarly, element 274 produces a difference 2ΔT for the time for pulses to travel through waveguide 269 and to travel through waveguide 270. For these time delays, variable TGG 260 produces a CPA 234 having four equally spaced pulses from the each pulse 156 received from waveguide 106.

U.S. patent application Ser. No. 09/282,880 ('880), filed Mar. 31, 1999 describes other TGG designs, which a person of ordinary skill in the art would be able to combine with the present disclosure to make still other embodiments of variable TGG's. These other variable TGG's can produce CPA's having any desired number of pulses and/or CPA's having nonuniform pulse spacings. The optical paths of these other variable TGG's may also include elements that individually modulate amplitudes of the pulses in the CPA's. Some of these embodiments may not use an intensity discriminator to remove intensity peaks from the output interference pattern produced by the TGG and dispersive medium. For example, some TGG's do not produce the side peaks 116, 118 in the pattern 120 of FIG. 4A. The '880 patent application is incorporated by reference, in its entirety, in the present application.

Figure 10:
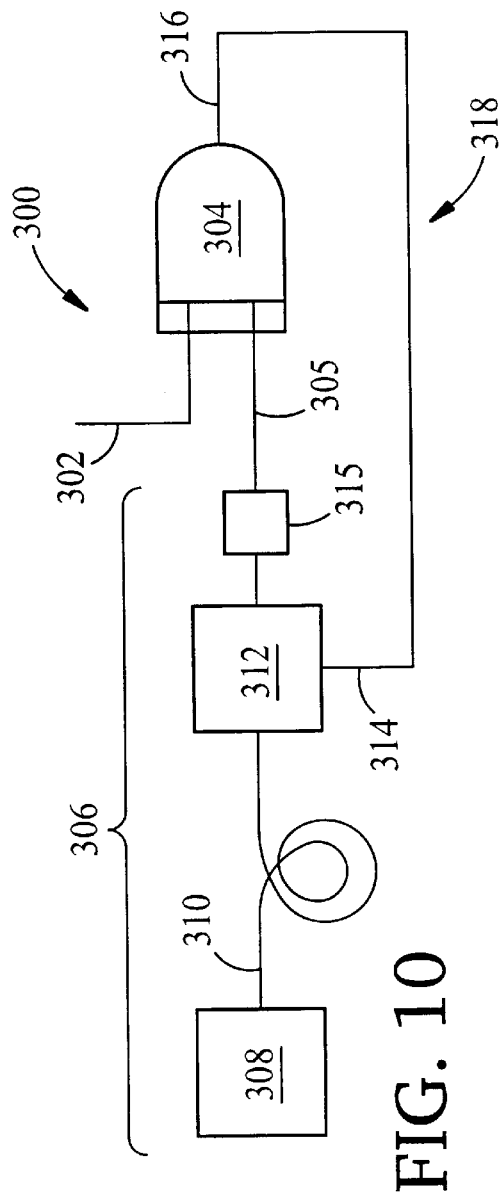
FIG. 10 shows an embodiment of an optical phase locked loop.

FIG. 10 shows an embodiment of an optical phase locked loop 300 (OPLL). OPLL 300 receives an externally generated optical pulse stream at a first input terminal 302 of an optical switch 304. A second input terminal 305 of optical switch 304 receives clock pulses generated by an optical clock having a variable offset 306.

Optical clock 306 includes a standard optical clock 308. Clock 306 transmits clock pulses to a dispersive optical waveguide 310. Optical waveguide 310 broadens and transmits each clock pulse to a variable TGG 312. Variable TGG 312 produces an interference pattern from the each clock pulse. An intensity discriminator 315 recovers an offset clock pulse from each interference pattern.

A control terminal 314 of TGG 312 receives optical signals from an output terminal 316 of optical switch 304 via an optical feed back loop 318. The feedback signal controls the offset of optical clock 306 to continuously resynchronize the pulses on output terminal 320 to the optical pulse stream received from input terminal 302. Since feedback loop 318 is optical, OPPL 300 can very quickly resynchronize to new pulse streams on input terminal 302.

Figure 11:
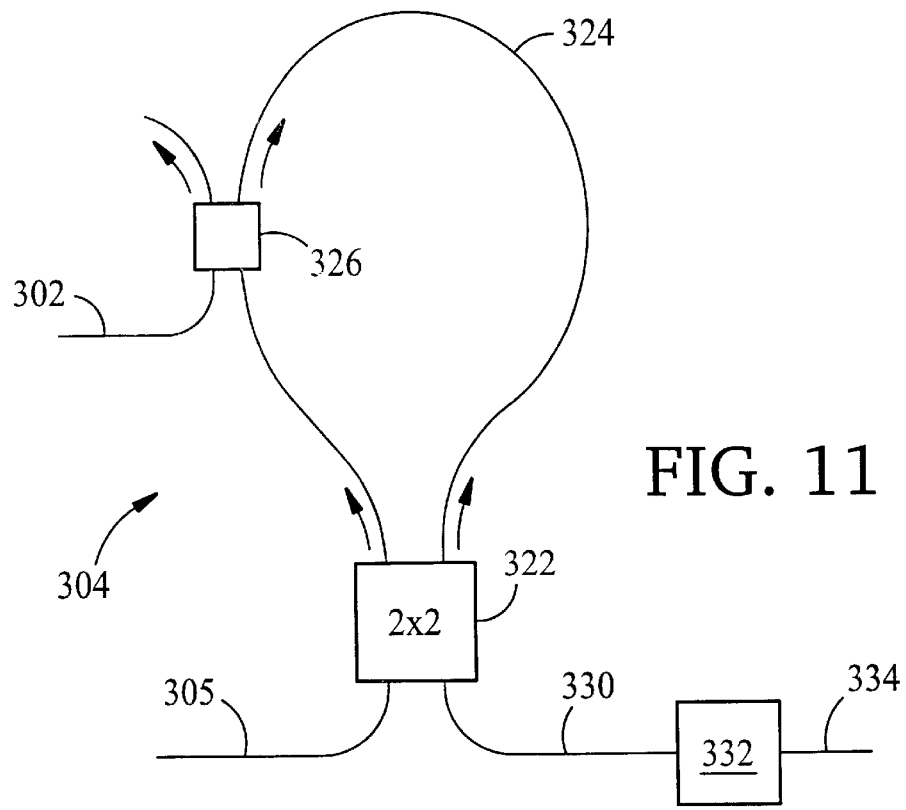
FIG. 11 shows an all-optical switch for use in the phase locked loop of FIG. 10.

FIG. 11 illustrates an optical switch 304 that can be used in the OPLL 300 of FIG. 10. Switch 304 uses a 2×2 waveguide splitter 322 to split an optical pulse from input terminal 305 into first and second pulses propagating in respective clockwise and counterclockwise senses on a loop 324. The first and second pulses recombine at coupler 322 and exit by the same input terminal 305 unless an external condition modifies the phase of one of the pulses.

Input terminal 302 of a 2×2 waveguide coupler 326 receives control pulses, which provide such external conditions. The 2×2 splitter 326 transmits half of each control pulse to loop 324 with a clockwise propagation. The control pulse changes the light intensity in the portion of loop 324 adjacent thereto. The changed light intensity changes the index of refraction of nonlinear material of loop 324.

When the control and first pulses are timed to co-propagate, the first pulse receives an added phase shift due to changed index of refraction. The added phase shift enables the first and second pulses to produce an output pulse on waveguide 330 upon recombining. The amplitude of the pulse produced correlates to the temporal offset between the control and first pulses.

A filter 332 removes the control pulse from waveguide 330 so that output terminal 334 is uncontaminated by the control pulse.

Figure 12:
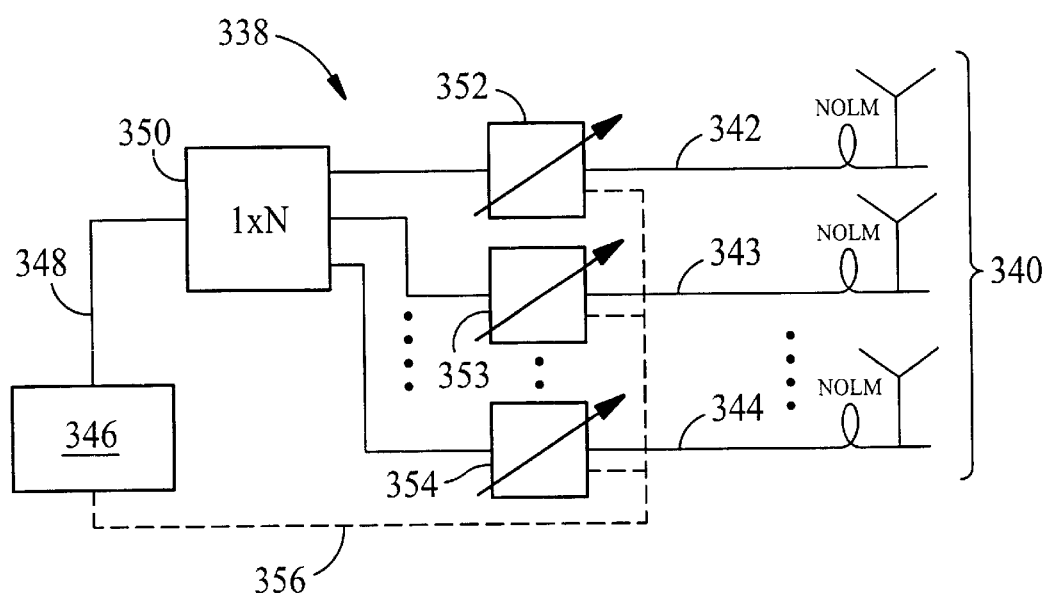
FIG. 12 shows a phased antennae array, which uses variable TGG's to rephase the array.

The variable optical time delays 100 and 130 of FIGS. 4A and 4B have a variety of applications. One application is controlling a phased remote antenna array 338 shown in FIG. 12.

The remote antenna array 338 uses a control system 346 to optically control N remote antennae 340. Control system 346 sends optical control signals to an input terminal of a 1×N waveguide coupler 350 via an optical waveguide 348. The output terminals of the 1×N waveguide coupler 350 route the signals to N separate variable TGG's 352, 353, and 354. The output of each TGG 352, 353, and 354 couples to a dispersive waveguide 342, 343, and 344, which carries the control signal to one of the antennae 340.

Control system 346 rephases the array 338 by varying the arrival times of the control signals at the various antennae 340. To rephase array 388, the control system 346 sends control pulses to control terminals of the variable TGG's 352, 353, and 354 via line 356. The control pulses change the temporal spacings of CPA's produced by the TGG's 352, 353, and 354. At the antennae 340, the control signals are interference patterns of the pulses of the CPA's due to dispersion broadening produced by waveguides 342, 343, and 344. The different temporal spacings affect the arrival times of the control signals at the various remote antennae 340.

Other embodiments are within the scope of the following claims.

What is claimed is:

1. A variable temporal grating generator (TGG), comprising:
   an amplitude splitter to split a received optical pulse into a plurality of pulses;
   a plurality of optical waveguides, each waveguide connected to receive one of the pulses from the splitter, at least one of the waveguides comprising a variable path element, the variable path element having a control terminal and an optical path length responsive to control signals received at the control terminal; and
   a waveguide coupler connected to receive pulses from the optical waveguides, the coupler having an output terminal to transmit coherent pulse arrays (CPAs) made of the pulses received.

2. The variable TGG of claim 1, wherein the variable path element further comprises:
   a nonlinear optical medium coupled to receive pulses traveling through the one of the waveguides; and
   wherein the signals received by the control terminal are optical signals and the control terminal is connected to transmit a portion of each optical signal to the nonlinear medium.

3. The variable TGG of claim 2, wherein the variable path element further comprises:
   a filter to impede the control signals from propagating to the waveguide coupler.

4. The variable TGG of claim 1, further comprising:
   an output optical waveguide coupled to receive the CPAs from the output terminal; and
   a high frequency signal generator coupled to send driving signals to a portion of the output optical waveguide, the driving signals to vary the index of refraction of the portion of the output optical waveguide.

5. The variable TGG of claim 4, wherein the signal generator is capable of producing electrical driving signals correlated to separate pulses of said CPAs.

6. The variable TGG of claim 4, wherein the signal generator is capable of producing optical driving signals correlated to separate pulses of said CPAs.

7. A variable optical delay line, comprising:
   a length of dispersive medium having two ends; and
   a temporal grating generator (TGG) having an optical input terminal, an optical output terminal and a control terminal, one of the optical input terminal and the optical output terminal being coupled to one end of the dispersive medium, the TGG to generate a coherent pulse array (CPA) at the optical output terminal from each pulse received at the optical input terminal, temporal spacings of pulses of each CPA being responsive to signals received at the control terminal, and the dispersive medium to cause each CPA to produce an interference pattern.

8. The variable optical delay line of claim 7, wherein the dispersive media is a dispersive optical waveguide.

9. The variable optical delay line of claim 7, wherein the variable TGG further comprises:
   an amplitude splitter to split an optical pulse received from the input terminal into a plurality of pulses;
   a plurality of optical waveguides, each waveguide connected to receive one of the pulses from the splitter, at least one of the waveguides comprising a variable path element, the variable path element coupling to the control terminal and an optical path length responsive to control signals received at the control terminal; and
   a waveguide coupler connected to receive pulses from the optical waveguides, the waveguide coupler having a second output terminal to transmit a portion of the pulses received.

10. The variable optical delay line of claim 8, further comprising:
    an optical clock to produce coherent optical clock pulses, the output terminal of the clock being connected to one of an end of the waveguide and the input terminal of the variable TGG.

11. The variable optical delay line of claim 8, further comprising an intensity discriminator connected to receive each interference pattern.

12. The variable optical delay line of claim 8, wherein the control terminal is capable of receiving an optical signal.

13. The variable optical delay line of claim 10, wherein the output terminal of the optical clock is connected to one end of the dispersive waveguide.

14. The variable optical delay line of claim 10, further comprising:
    an intensity discriminator connected to receive each interference pattern.

15. The variable optical delay line of claim 11, wherein the intensity discriminator comprises a non-linear optical loop mirror (NOLM).

16. The variable optical delay line of claim 9, wherein the variable path element further comprises:
- a nonlinear optical medium coupled to receive pulses traveling through the one of the waveguides; and
- wherein the signals received by the control terminal are optical signals and the control terminal is connected to transmit a portion of each optical signal to the nonlinear medium.

17. The variable optical delay line of claim 16, wherein the variable path element further comprises:
- a filter to impede the control signals from propagating to the waveguide coupler.

18. An optical phase locked loop, comprising:
- an optical switch having first and second input terminals and an output terminal;
- an optical clock to produce clock pulses;
- a dispersive optical waveguide coupled to the optical clock; and
- a variable temporal grating generator (TGG) having a control terminal, being coupled to receive the clock pulses from the dispersive waveguide, and being coupled to transmit interference patterns to the second input terminal of the optical switch, the output terminal of the switch being coupled to the control terminal.

19. The optical phase locked loop of claim 18, wherein the output terminal of the switch is coupled to transmit optical signals to the control terminal.

20. The optical phase locked loop of claim 19, wherein the variable TGG comprises:
- an amplitude splitter to split a received clock pulse into a plurality of pulses;
- a plurality of connecting optical waveguides, each connecting waveguide connected to receive one of the pulses from the splitter, at least one of the connecting waveguides comprising a variable path element, the variable path element having the control terminal and an optical path length responsive to the optical signals received at the control terminal; and
- a waveguide coupler connected to receive pulses from the connecting optical waveguides, the coupler having an output terminal to transmit coherent pulse arrays (CPAs) made of the pulses received.

21. The optical phase locked loop of claim 20, wherein the variable path element further comprises:
- a nonlinear optical medium coupled to receive clock pulses traveling in the one of the connecting waveguides; and
- wherein the control terminal is connected to transmit a portion of each optical control signal to the nonlinear medium.

22. The optical phase locked loop of claim 20, wherein the variable path element further comprises:
- a filter to impede optical control signals from propagating to the waveguide coupler.

23. An antenna array, comprising:
- a plurality of remote antennae;
- a control system to produce optical control signals;
- a plurality of first optical waveguides coupled to receive the optical control signals from the control system;
- a plurality of variable temporal grating generators (TGG), each TGG coupled to one of the first optical waveguides; and
- a plurality of second optical waveguides, each second optical waveguide connecting one of the TGGs to one of the remote antennae, each second optical waveguide capable of producing an interference pattern from a coherent pulse array (CPA) received from the connected TGG.

24. The antennae array of claim 23, wherein the control system couples to a control terminal of each variable TGG.

25. The antennae array of claim 23, wherein the control system is capable of sending first and second signals to the control terminals of respective first and second ones of the TGGs, the first and second signals to produce CPAs with different pulse spacings.

* * * * *